United States Patent
Jozwiak et al.

(10) Patent No.: US 8,934,875 B2
(45) Date of Patent: Jan. 13, 2015

(54) LOCATION BASED SYSTEM TO DELIVER TARGETED CONTENT MESSAGES TO MOBILE DEVICES

(75) Inventors: John Jozwiak, San Diego, CA (US); Brian Rosenberg, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1210 days.

(21) Appl. No.: 12/435,930

(22) Filed: May 5, 2009

(65) Prior Publication Data

US 2010/0285820 A1   Nov. 11, 2010

(51) Int. Cl.
| | |
|---|---|
| *H04Q 7/00* | (2006.01) |
| *H04L 29/08* | (2006.01) |
| *G06Q 30/02* | (2012.01) |
| *H04W 4/02* | (2009.01) |
| *H04W 8/18* | (2009.01) |
| *H04W 84/04* | (2009.01) |

(52) U.S. Cl.
CPC ............... *H04L 67/20* (2013.01); *G06Q 30/02* (2013.01); *H04W 4/02* (2013.01); *H04L 67/306* (2013.01); *H04L 67/26* (2013.01); *H04L 67/18* (2013.01); *H04W 8/18* (2013.01); *H04W 84/045* (2013.01)
USPC ..................... 455/414; 455/414.1; 455/414.2; 455/414.4

(58) Field of Classification Search
USPC ........... 455/414.1, 414.2, 414.4, 414; 705/14, 705/14.58; 379/76, 167
See application file for complete search history.

(56) References Cited

U.S. PATENT DOCUMENTS

| | | | |
|---|---|---|---|
| 7,027,801 B1 | 4/2006 | Hall et al. | |
| 7,136,470 B1 | 11/2006 | Taylor et al. | |
| 8,385,514 B2* | 2/2013 | Batni et al. | ...................... 379/76 |
| 2001/0051517 A1* | 12/2001 | Strietzel | ........................ 455/414 |
| 2006/0058037 A1* | 3/2006 | Kenyon | ..................... 455/456.1 |
| 2008/0120176 A1 | 5/2008 | Batni et al. | |
| 2008/0294607 A1* | 11/2008 | Partovi et al. | ..................... 707/3 |
| 2009/0177484 A1* | 7/2009 | Davis et al. | ........................ 705/1 |
| 2009/0203361 A1* | 8/2009 | Huang et al. | ............... 455/414.1 |
| 2010/0070334 A1* | 3/2010 | Monteverde | .................... 705/10 |
| 2010/0151821 A1* | 6/2010 | Sweeney et al. | ............. 455/410 |

FOREIGN PATENT DOCUMENTS

| | | | |
|---|---|---|---|
| JP | H0548728 A | 2/1993 | |
| JP | H11252645 A | 9/1999 | |

(Continued)

OTHER PUBLICATIONS

International Search Report and Written Opinion—PCT/US09/50584—ISA/EPO—Oct. 1, 2012.

(Continued)

*Primary Examiner* — Patrick Edouard
*Assistant Examiner* — Julio Perez

(57) ABSTRACT

Disclosed is a system to implement a method to deliver a targeted content message to a mobile device base on the location of the mobile device. The system may identify a set of businesses within a coverage area of a femtocell base station to produce gathered information. The system may receive a request for a call establishment indicator from the mobile device through the femtocell base station. Targeted content messages may be identified as a function of the gathered information. Moreover, the targeted content message then may be sent to the mobile device as part of the call establishment indicator.

23 Claims, 6 Drawing Sheets

(56) References Cited

FOREIGN PATENT DOCUMENTS

| | | |
|---|---|---|
| JP | 2002044733 A | 2/2002 |
| JP | 2004048795 A | 2/2004 |
| JP | 2005537591 A | 12/2005 |
| KR | 100647778 B1 | 11/2006 |
| WO | WO-0035216 A1 | 6/2000 |
| WO | 0062564 A1 | 10/2000 |
| WO | WO-2004021110 A2 | 3/2004 |
| WO | 2008093788 A1 | 8/2008 |
| WO | WO-2008094032 A1 | 8/2008 |

OTHER PUBLICATIONS

Taiwan Search Report—TW098123780—TIPO—Jul. 20, 2012.
Co-pending U.S. Appl. No. 09/290,506, filed Apr. 12, 1999.
Supplementary European Search Report—EP09844456—Search Authority—Munich—Nov. 10, 2014.

* cited by examiner

LOCATION BASED SYSTEM TO DELIVER TARGETED CONTENT MESSAGES TO MOBILE DEVICES

FIELD

The following relates generally to wireless communications, and more specifically to distributing coupons and other targeted content messages to mobile devices such as mobile phones based on the location of a femtocell base station utilized by those mobile devices.

BACKGROUND

Targeted content messages may include coupons as advertising devices used by business to help persuade customers to return and redeem the coupon at their store. A main incentive for the consumer is savings since coupons may give a price reduction off the purchase of a product or service. Typically, manufacturers and retailers distribute coupons through newspapers, flyers, and mail circulars.

Recently, advertisers have taken to using the Internet to distribute coupons. Internet coupons are distributed to users at their desktop computers as printable coupons and coupon codes. Printable coupons include those coupons are available on the Internet that may be printed from a home computer and used in local stores. Coupon codes mostly are code numbers that may be entered into a portion of an online ordering form. The code engages a coupon that may be applied to the total purchase before the consumer makes the online payment. While distributing coupons over the Internet is a valuable way for businesses to advertise their services and customers to save money, their success is limited when it comes to enticing a customer to enter a store when that customer is near that store.

SUMMARY

Disclosed is a system to implement a method to deliver a targeted content message to a mobile device base on the location of the mobile device. The system may identify a set of businesses within a coverage area of a femtocell base station to produce gathered information. The system may receive a request for a call establishment indicator from the mobile device through the femtocell base station. Targeted content messages may be identified as a function of the gathered information. Moreover, the targeted content message then may be sent to the mobile device as part of the call establishment indicator.

Figure 1:
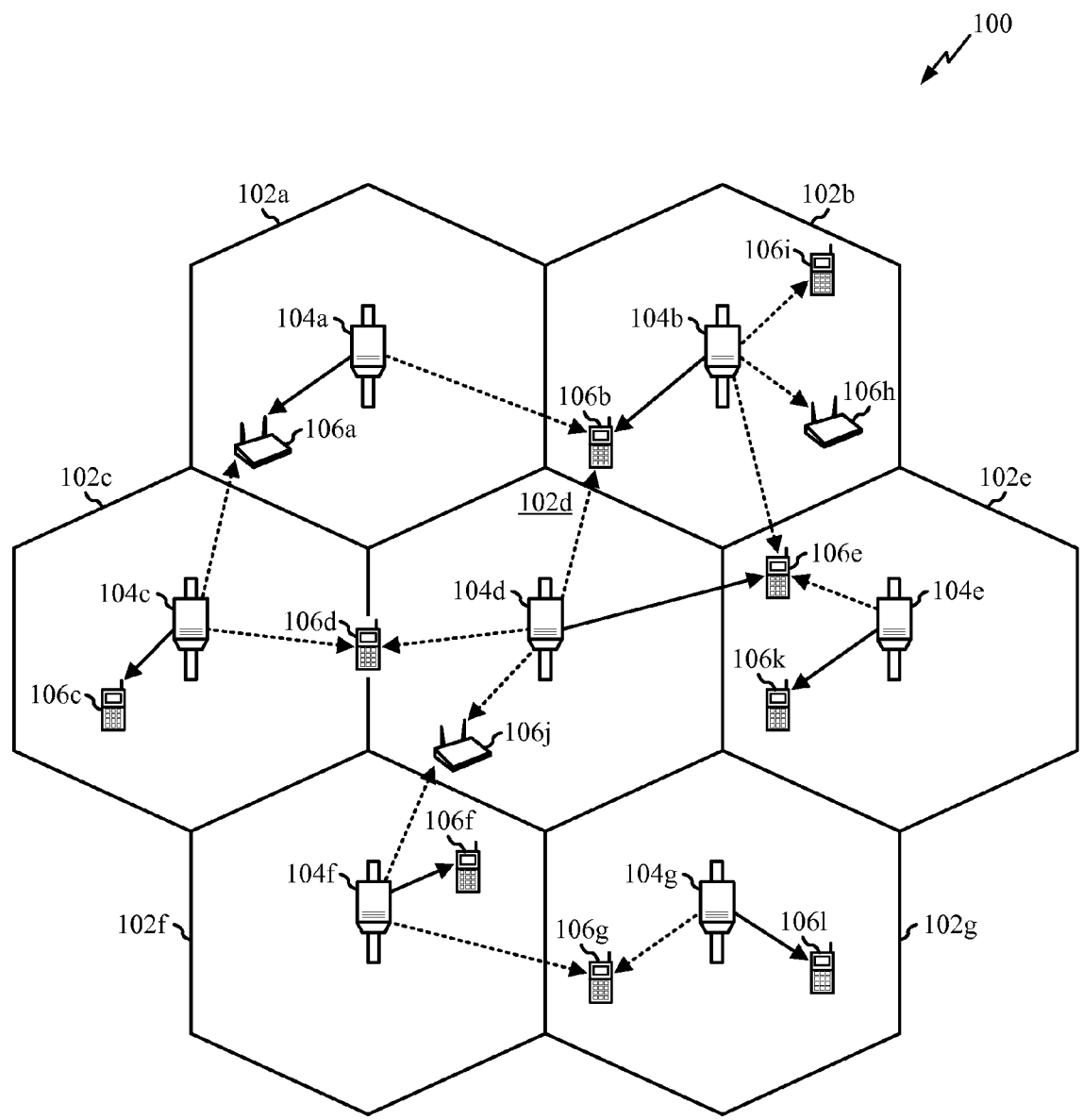
FIG. 1 illustrates an exemplary wireless communication system 100.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, software, or a combination of hardware, firmware, and/or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device may also be called, and may contain some or all of the functionality of a system, subscriber unit, subscriber station, mobile phone, mobile station, mobile, wireless terminal, device, remote station, remote terminal, access terminal, user terminal, terminal, wireless communication device, wireless communication apparatus, user agent, user device, or user equipment (UE). A mobile device may be a cellular telephone, a cellular mobile device, a cordless telephone, a Session Initiation Protocol (SIP) phone, a smart phone, a wireless local loop (WLL) station, a personal digital assistant (PDA), a laptop, a handheld communication device, a handset, a phone, a handheld computing device, a satellite radio, a wireless modem card and/or another processing device for communicating over a wireless system. Moreover, various aspects are described herein in connection with a base station. A base station may be utilized for communicating with wireless terminal(s) and also may be called, and may contain some or all of the functionality of, an access point, Node B, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The word "exemplary" is used herein to mean "serving as an example, instance, or illustration." Any embodiment described herein as "exemplary" is not necessarily to be construed as preferred or advantageous over other embodiments. The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" often are used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). 3GPP is a collaboration between groups of telecommunications associations, to make a globally applicable third generation (3G) mobile phone system specification within the scope of the International Mobile Telecommunications-2000 project of the International Telecommunication Union (ITU). 3GPP2 is a collaboration between telecommunications associations to make a globally applicable third generation (3G) mobile phone system specification within the scope of the ITU's International Mobile Telecommunications-2000 (IMT-2000) project. These various radio technologies and standards are known in the art.

FIG. 1 illustrates an exemplary wireless communication system 100. Exemplary wireless communication system 100 may be configured to support the communication needs of a number of users, in which various disclosed embodiments and aspects may be implemented. As shown in FIG. 1, by way of example, system 100 provides communication for multiple cells 102, such as, for example, macro cells 102a-102g. Each macrocell 102 is an area of radio coverage in wireless communication system 100 served by one or more base stations. The wireless communication system 100 may provide service over a large geographic region, for example, macrocells 102a-102g may cover a few blocks in a neighborhood.

Each macrocell 102 may be serviced by a corresponding access point (AP) 104 (such as APs 104a-104g), such as by a macrocell base station. A macrocell base station may utilize power outputs of typically tens of watts to cover an outdoor cell site of about five kilometers in which the station may receive wireless signals from a relatively large number of mobile devices. The antennas for macrocells may be mounted on ground-based masts, rooftops and other existing structures, at a height that provides a clear view over the surrounding buildings and terrain.

Each macrocell 102 may be further divided into one or more sectors. Various access terminals (ATs) 106, including ATs 106a-106k, also known interchangeably as user equipment (UE) or mobile stations, may be dispersed throughout the system. As mobile phones, the access terminals may include portable telephones that may connect with a telephone network over radio wave transmission. Each AT 106 may communicate with one or more APs 104 on a forward link (FL) and/or a reverse link (RL) at a given moment, depending upon whether the AT is active and whether it is in soft handoff, for example.

Femtocell base stations additionally may be dispersed throughout the system. A femtocell base station is a small, box-sized device that may cover an indoor cell site of a few dozen to a couple hundred meters. A main advantage of a femtocell base station is that it allows users in and near a business, office, or home to use their mobile device without concern that the walls of their building will significantly weaken their signal.

Figure 2:
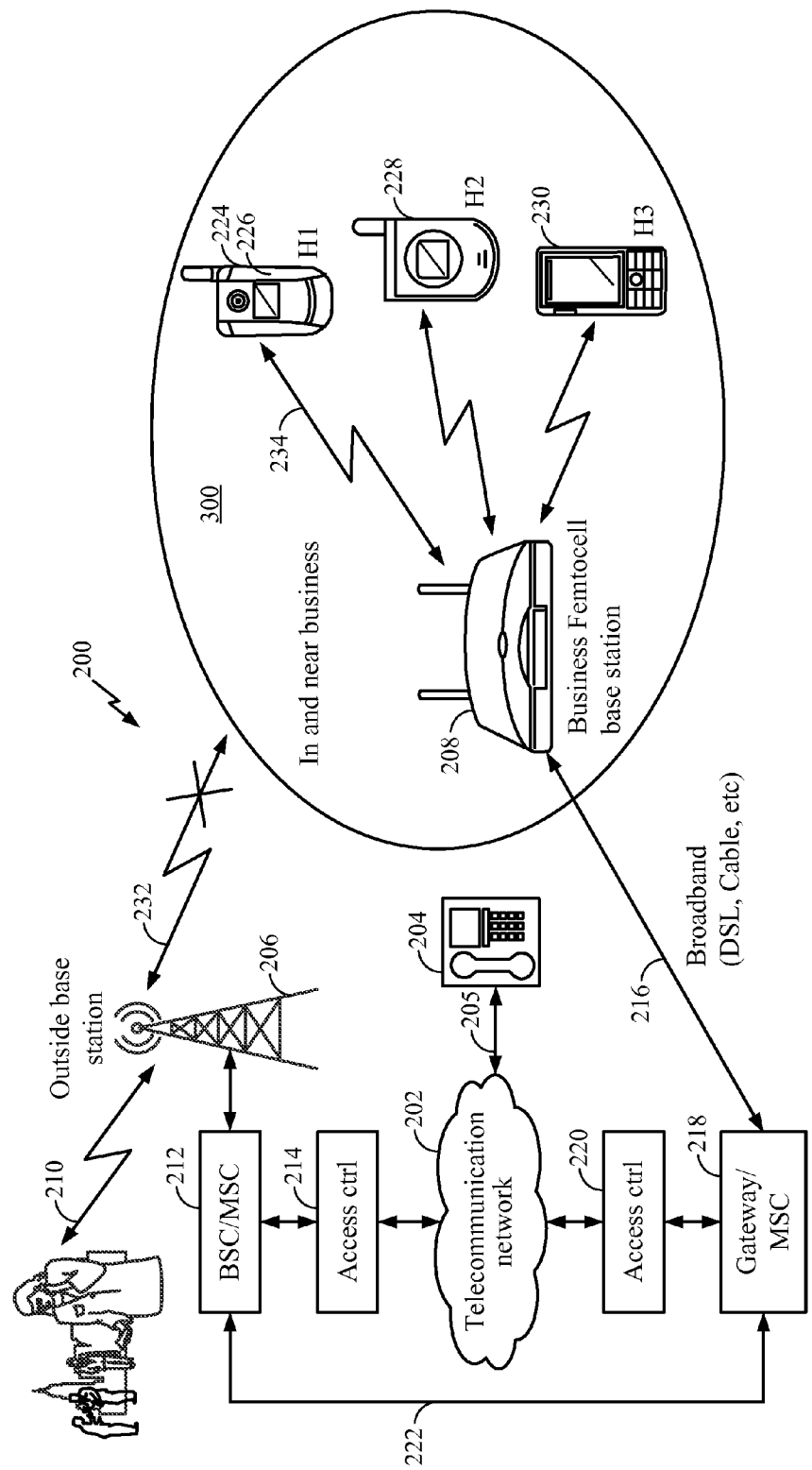
FIG. 2 is a schematic diagram of a telecommunication system 200.

FIG. 2 is a schematic diagram of a telecommunication system 200. Telecommunication system 200 may include a group of independent but interrelated elements to assist in the transmission of signals over a distance for a purpose of communication. Telecommunication system 200 may include a telecommunication network 202 that may be accessed in a variety of ways, including a landline 204, a macrocell base station 206, and a femtocell base station 208.

Telecommunication network 202 may be a network of telecommunications links and nodes arranged so that messages may be passed from one part of the network to another over multiple links and through various nodes. Telecommunication network 202 may include a computer network, the internet network as a global 'network of networks', a public switched telephone network, a global telex network, and the aeronautical Aircraft Communications Addressing and Reporting System network. In addition, telecommunication network 202 may carry control information, traffic from the users of the network, and operations and administration traffic required for network management.

Landline 204 may be a telephone line that may communicate with telecommunication network 202 through a signal that may travel through a metal wire, optical fiber, or other solid medium 205. Also known as a main line and a fixed-line, landline 204 may include a telephone whose signaling and audio information may be handled on a twisted pair of insulated wires. A twisted pair line may be more effective at rejecting electromagnetic interference and crosstalk than an untwisted pair.

Macrocell base station 206 may be a tower installed at a fixed location and having an antenna to provide outdoor coverage for mobile device signals 210 such as within a 3 mile (5 kilometer) radius. Macrocell base station 206 may access telecommunication network 202 through a Base Station Controller (BSC)/Mobile Switching Center (MSC) 212 and access control 214. The Base Station Controller portion of BSC/MSC 212 may act as a concentrator where many different low capacity connections become reduced to a smaller number of connections towards the Mobile Switching Center. Access control 214 may define or restrict passage of signals between BSC/MSC 212 and telecommunication network 202.

Femtocell base station 208 may be a small cellular base station for use in and near residential environments and small business environments, such as a building 300. Femtocell base station 208 may allow service providers to extend cellular service coverage indoors, especially where access otherwise may be limited or unavailable. In addition, femtocell base station 208 may provide a service to cellular users that happen to be in close proximity to femtocell base station 208, where its signal may be stronger than that of a macrocell. In an example, femtocell base station 208 may be a device that is not intended to be mobile and is intended to reside in a fixed location.

Femtocell base station 208 may communicate with telecommunication network 202 through backhaul 216, gateway/Mobile Switching Center (MSC) 218, and access control 220. Backhaul 216 may transport traffic between distributed sites provided by gateway/MSC 218 and femtocell base station 208. Typically, femtocell base station 208 may be connected to the Internet and the cellular operator's network via DSL router or cable modem. In an example, backhaul 216 may include at least one of a consumer owned digital subscriber line (DSL), a cable, and a fiber link. Gateway/MSC 218 and access control 220 may function similarly to BSC/MSC 212 and access control 214, respectively. BSC/MSC 212 and Gateway/MSC 218 may transmit signals back and forth over a signal path 222. By directing calls to a consumer installed femtocell that also uses consumer owned backhaul, such as DSL or cable, the cellular network operator may realize substantial savings in capital and operating expenditures.

As a personal miniature base station installed in subscriber's location, femtocell base station 208 may employ the radio access network (RAN) functionality (e.g., BTS, BSC, PDSN) and provide service to a limited number of users. Femtocell base station 208 may provide service similar to a typical PSTN connected wired or cordless phone system with multiple receivers. An example functionality of femtocell base station 208 is a Universal Mobile Telecommunications System (UMTS) femtocell containing a Node B, Radio Network Controller (RNC), and general packet radio services (GPRS) Support Node (SGSN) with Ethernet for backhaul. Femtocell base station 208 additionally may incorporate standards such as GSM, cdma2000, Time Division-Synchronous Code Division Multiple Access (TD-SCDMA), and Worldwide Inter-operability for Microwave Access (WiMAX) solutions.

Figure 3:
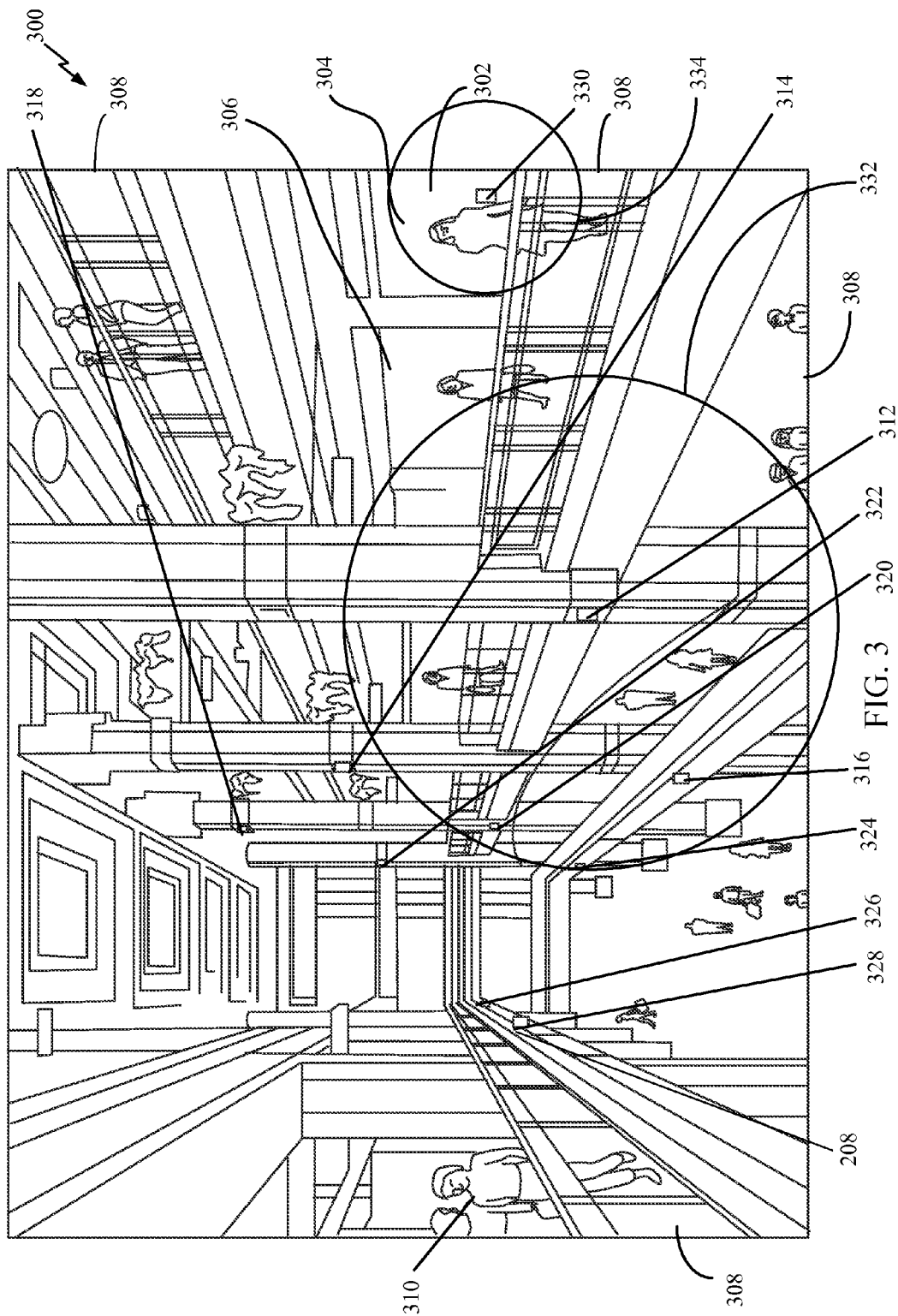
FIG. 3 is a schematic of building 300.

FIG. 3 is a schematic of building 300. Building 300 may be a structure that has a roof and walls, such as a shopping mall, office building, or residential home. For purposes of discussion, building 300 is drawn in FIG. 3 as a shopping mall 300 having retail units 302, such as a store 304 and a store 306, and interconnecting walkways 308 to enabling visitors 310 to easily walk from one shop 302 to the next. Retail units 302 may include mercantile establishments for the sale of goods or services. Walkways 308 may include paths set aside for walking. Visitors 310 may include invitees, such as people who entered building 300 with for a purpose of business or other dealings, and licensees whose activities may be conducted at the behest of an owner or possessor of areas within building 300. Visitors 310 also may include someone who visits and employees.

Building 300 may include a plurality of femtocell base stations 208. For example, the owner of building 300 may install femtocell base stations 312 to 328 to service the wireless communication needs of its employees and visitors 310. The proprietors of retail units 302 may install femtocell base stations to service the wireless communication needs of their own employees and visitors 310. For example, store 304 may include a femtocell base station 330.

Femtocell base stations 208, including femtocell base stations 312 to 328 and femtocell base station 330, may service mobile devices 224 (FIG. 2) in and near building 300. For example, shopping mall owned femtocell base station 312 may serve mobile devices 224 within a femtocell service region 332 and proprietor owned femtocell base station 330 may serve mobile devices 224 within a femtocell service region 334. Femtocell service region 332 and femtocell service region 334 each may be a geographic region within which mobile devices 224 may communicate with femtocell base station 312 and femtocell base station 330, respectively.

Femtocell base station 208 typically may support up to eight mobile devices 224 in a business setting. In an example, femtocell base station 208 may support mobile device 226 (handset 2 or H1) (FIG. 2), mobile device 228 (handset 3 or H2), and mobile device 230 (handset 3 or H3).

Femtocell base station 208 may broadcast the communication services of a single wireless service provider within a particular part of the 9 kHz to 300 GHz wireless spectrum. The wireless service providers may include T-Mobile®, Sprint®, Verizon®, and AT&T®. Each femtocell base station 314 in shopping mall 300 may be wireless plan specific. In one example, femtocell base station 314 may include a first femtocell base station for AT&T® customers and a second adjacent femtocell base station for Verizon® customers.

In operation, building 300 may prevent reasonable connection between macrocell base station 206 and mobile devices 224 through a macrocell base station signal 232. For example, interior walls, exterior walls, and windows of building 300 may result in signal power loss over a traveled path. When femtocell base station 208 is installed in building 300, mobile devices 224 may communicate exclusively with femtocell base station 208 through a mobile device signal 234 with minimal power loss. In an example, a mobile device 224 may use a little energy to monitor signals from femtocell base station 208 approximately every 2.5 seconds.

Femtocell base station 208 may service the wireless communication needs of mobile devices 224 preregistered with the particular femtocell base station 208 as their business femtocell base station. Preregistered mobile devices may include those of the owner of the shopping mall, the proprietors of the stores within the shopping mall, and employees of these businesses. In addition, femtocell base station 208 may services the wireless communication needs of visiting mobile devices. Here, the mobile phones belonging to workers assigned to work in a particular store 302 may be viewed as business phones whereas the mobile phones of guests, visitors, those passing through the wireless communication coverage area of shopping mall owned femtocell base station 312 or proprietor owned femtocell base station 330 may be viewed as visiting mobile devices.

As people move in and out of shopping mall femtocell service region 332 and proprietor femtocell service region 334, their mobile device 224 may move in and out of femtocell service region 202. Thus, the makeup of the set of all mobile devices 224 within a given femtocell service region may change over time. In addition, some femtocell base stations will service only those mobile devices having a subscription to a particular wireless provider. For example, a first femtocell base station 316 may only service mobile devices 224 that maintain a Verizon® wireless service plan whereas a second, adjacent femtocell base station 316 may only services mobile devices 224 that maintain a Sprint® wireless service plan. In an example, building 300 may include sufficient femtocell base stations 208 to provide services for those mobile phone subscribers within building 300.

Figure 4:
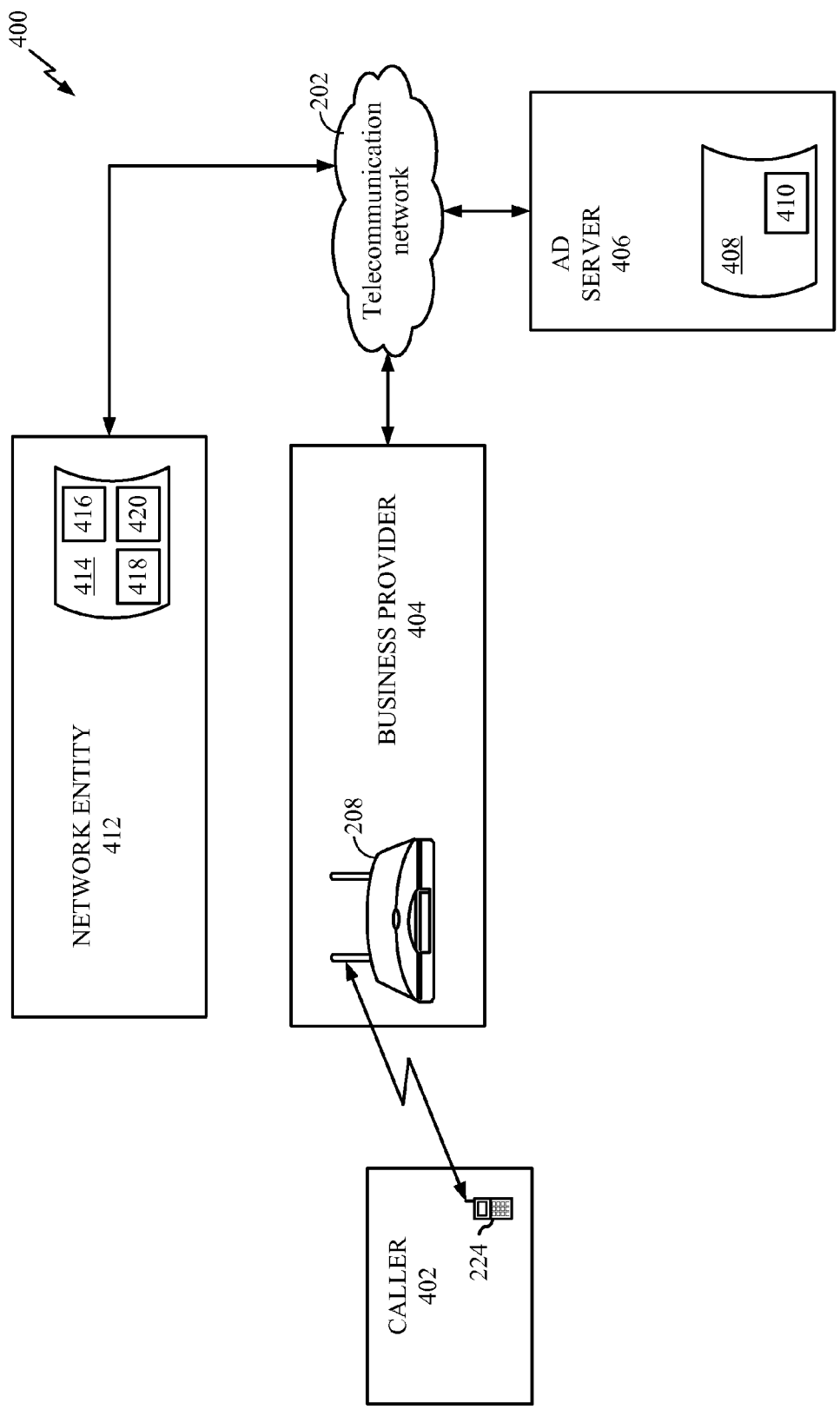
FIG. 4 is a block diagram of a system 400 to deliver coupons to mobile devices.
Figure 5:
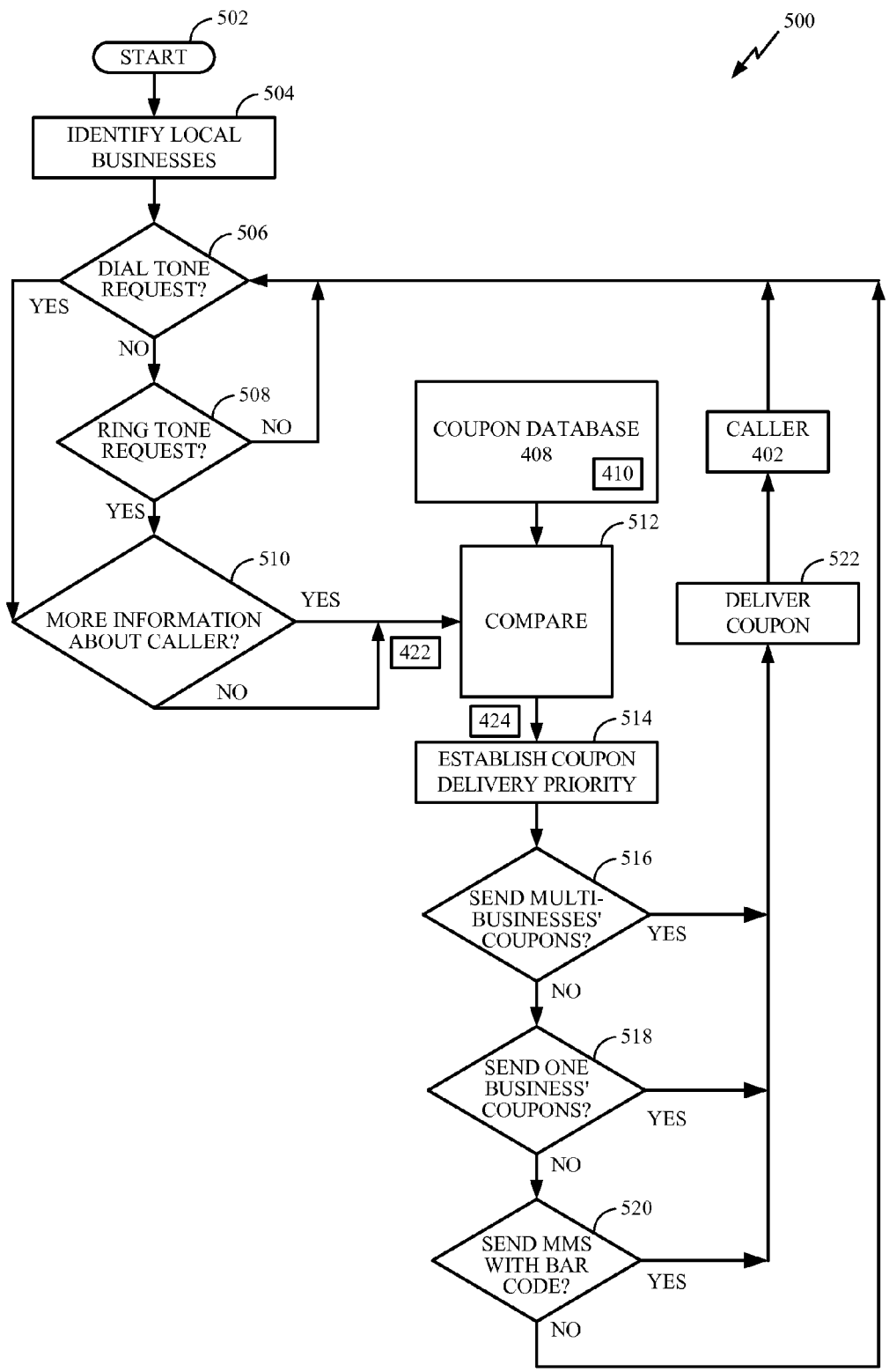
FIG. 5 illustrates a method 500 to deliver coupons to mobile devices utilizing system 400.

FIG. 4 is a block diagram of a system 400 to deliver coupons to mobile devices. FIG. 5 illustrates a method 500 to deliver coupons to mobile devices utilizing system 400. Method 500 may deliver a targeted content message based on a location of a caller 402.

In system 400 and method 500, caller 402, such as a user holding a mobile device 224, may represent the mobile devices. A business provider 404 may own and operate a femtocell base station 208 that may be in communication with telecommunication network 202. Caller 402 may make a call that may be carried by femtocell base station 208 operated by business provider 404. An ad server 406 may maintain a coupon database 408 storing coupons 410. Coupons 410 may be targeted content messages stored in a variety of forms that may be capable of being formatted into a variety of forms, such as a completed coupon to be transmitted through a text message, or an image of a coupon having a bar code that may be scanned, where the coupon may be transmitted as a Multimedia Messaging Service (MMS) message. System 400 further may include a telecommunication provider 412 having a profile database 414 that may house location information 416, caller information 418, and business information 420. Telecommunication provider 412 may be a network entity 412. System 400 and method 500 may utilize part or all of wireless communication system 100 and/or telecommunication system 200.

Method 500 may start at step 502. At step 504, network entity 412 may identify businesses and other retail units 302 within the coverage area of femtocell base station 208. Generally, retail units 302 will have preregistered the phone numbers of their mobile devices with a particular femtocell base station 208 and the location of such phone numbers may be known and, in turn, the location of the given femtocell base station 208 can be known. In addition, a given femtocell base station 208 may receive wireless requests from a number of mobile devices 224. The more requests the given femtocell base station 208 received from a particular mobile device 224, the more likely that such a mobile device 224 is a primary utilizer of the given femtocell base station 208. Information about the preregistered mobile devices 224, such as that one belongs to a Gap® store and one belongs to a See's Candy® store, may be stored within location information 416. Once determined, this set of retail units 302 generally will not change over time.

While macrocell 102 base stations can only narrow down a mobile device location to within a couple of hundred meters, the coverage area of femtocell base station 208 may be a couple tens of meters (ten to thirty meters). Visitors 310 located within such a small area may have a significant interest in the twenty or so retail units 302 located immediately near them that may be serviced by one femtocell base station. In turn, the twenty or so retail units 302 located immediately near a particular visitor 310 may be interested in luring that visitor 310 into their shop in hopes of making a sale.

Method 500 may take advantage of the small target area provided by a femtocell base station 208 to limit the amount of content to be broadcast while increasing the effectiveness of that broadcast. For example, assume that a femtocell base station is located near American clothing and accessories retailer The Gap, Inc.® and that store desires that everyone passing in front of the store carrying a mobile phone having an exportable profile to receive a Gap® coupon if their exportable profile indicates that the phone holder is under the age of thirty. Here, it may be easier to manage a distribution of such content from a femtocell base station performing relatively few tasks rather than from a macrocell base station, which performs a significant number of tasks to handle hundreds of cell phones in addition to covering a wide geographic area.

Coupons 410 and other targeted content messages should be sent at a time when visitor 310 is engaging with their mobile device 224. For example, targeted content messages 410 may be sent when caller 402 typically would otherwise receive a dial tone or a ringback tone. A dial tone includes a telephony signal used to indicate that the telephone exchange is working, has recognized an off-hook, and is ready to accept a call. A ringback tone is the audible ringing that may be heard on the telephone line by the calling party after dialing and prior to the call being answered at the receiving end. The ringback tone serves to assure the calling party that a ringing signal is being sent on the called party's line, although the ringback tone may be out of sync with the ringing signal. The ringback tone may be a ringing sound or a busy signal sound. Both the dial tone and the ringback tone may be locally generated in that if caller 402 dialed Chicago, Ill. from San Diego, Calif., the tone likely would be generated some place in California rather than in Chicago. Caller 402 may receive either a dial tone or ringback tone, but not both at the same time.

At step 506, method 500 may determine whether caller 402 has requested a dial tone through femtocell base station 208. Typically, caller 402 may request a dial tone on pressing an "on" button on mobile device 224 so that mobile device 224 engages in communication with femtocell base station 208. In addition, caller 402 may merely seek out coupons delivered by this described method by pressing the "on" button on mobile device 224 without an actual desire to make a phone call or without an actual follow-up of making a phone call. In this way, method 500 may convert a previously non-revenue generating event—the dial tone—to a revenue generating event without invoking the pay features of a mobile phone subscription service.

If caller 402 has requested a dial tone, then method 400 may proceed to step 510. If caller 402 has not requested a dial tone, then method 400 may determine at step 508 whether caller 402 has requested a ringback tone through femtocell base station 208. Typically, caller 402 may request a ringback tone by pressing a "send" button mobile device 224 after inputting a telephone number into mobile device 224. If caller 402 has not requested a ringback tone, then method 400 may return to step 506. If caller 402 has requested a ringback tone, then method 400 may proceed to step 510.

At step 510, network entity 412 may determine whether it has identifying information 418 about caller 402 within profile database 414. An example of identifying information about caller 402 may be an exportable version of the profile of the caller, including identity (e.g., name, age, gender), preferences, likes, and dislikes. The profile of caller 402 may include information about the user's behavior (which stores they have visited in the past, products they have bought), mobile service registration details, and information voluntarily provided by caller 402. The exportable profile may have traveled from mobile device 224 to network entity 412. Additionally, network entity 412 may have previously compiled profile data for the phone number of mobile device 224.

If network entity 412 determines at step 510 that it does have additional information on caller 402, then method 500 may proceed to step 512 with both location information 416 and caller information 418 as gathered information 422. If network entity 412 determines at step 510 that it does not have additional information on caller 402, then method 500 may proceed to step 512 with location information 416 about business provider 404 and other businesses located near femtocell base station 208 as gathered information 422.

At step 512, method 500 may compare gathered information 422 to coupons 410 in coupon database 408 to obtain a coupon set 424. In general, coupon set 424 may be a function of the immediate physical location of caller 402 and more particularly a function of both the businesses within the coverage area of femtocell base station 208 and a profile of caller 402 utilizing femtocell base station 208. Each coupon may include a price reduction or other incentive for caller 402 using the mobile device to return and redeem the coupon at one of the target business providers immediately near caller 402. Coupon set 424 may include coupons of business provider 404 and include coupons for other service providers located near business provider 404, namely that utilize femtocell base station 208. Coupon set 424 may include any targeted content message, including non-coupon advertisements and may include audio, visual, and vibratory or haptic features.

At step 514, method 500 may establish a coupon delivery priority for coupon set 424. The coupon delivery priority may be based on which targeted content message 410 promises to yield the most revenue such as to network entity 412. For example, if coupon set 424 contained both a Gap® coupon and a See's Candy® coupon and delivery of the See's Candy® coupon would generate more display revenue for network entity 412, then the See's Candy® coupon may be delivered first to mobile device 224 and, if sufficient time remained during the tone period, then the Gap® coupon could be delivered.

At step 516, method 500 may determine whether to send text message coupons to caller 402 for more than one business. The coupons for more than one business may include coupons for business provider 404—the owner of femtocell base station 208—and coupons for providers located near business provider 404. Business provider 404 may be motivated to provide coupons for providers located near business provider 404 through femtocell base station 208 if business provider 404 split the targeted content message display revenue with network entity 412. If method 500 determines to send text message coupons for more than one business, then method 500 may proceed to step 522 and send those text message coupons to the mobile device 224 utilized by caller 402. The coupons may be sent to caller 402 by network entity 412 in a form of text message with a coupon for each service provider. If method 500 determines not to send coupons for more than one business, then method 500 may proceed to step 518.

At step 518, method 500 may determine whether to send a text message coupon to caller 402 for the target service provider that owns femtocell base station 208; that is to say, method 500 may determine at step 518 determine whether to send caller 402 a text message coupon for business provider 404 only. If method 500 determines to send caller 402 a text message coupon for business provider 404, then method 500 may proceed to step 522 and send that text message coupon to the mobile device 224 utilized by caller 402. Here, network entity 412 may send caller 402 a text message with a coupon for the Gap®, for example. If method 500 determines not to send caller 402 a text message coupon for business provider 404, then method 500 may proceed to step 520.

At step 520, method 500 may determine whether to send caller 402 a coupon image. If method 500 determines to send caller 402 a coupon image, then method 500 may proceed to step 522 and send caller 402 a Multimedia Messaging Service (MMS) message with an image of a coupon with a bar code that can be scanned. If method 500 determines not to send caller 402 a coupon image, then method 500 may return to step 506.

A call establishment indicator may include any signal utilized to attract attention to and perhaps characterize a step in a process to bring about a wireless communication. For example, as used herein, a call establishment indicator may include both a dial tone and a ringback tone. At step 522, method 500 may send caller 402 a targeted content message, such as a coupon. The coupon may be delivered to caller 402's mobile device 224 through femtocell base station 208 in place of a call establishment indicator, such as a dial tone or a ringback tone. For example, through replacing dial or ringback call establishment tones, instead of hearing a ringback tone, caller 402 may hear, "While we attempt to locate your party, please stop by Auntie Anne's Pretzels® immediately near you to use the half-off coupon you just received in your phone." call establishment indicator In another example, method 500 may incorporate a discount on the phone call in exchange for listening to an advertisement for a business adjacent to caller 402. For example, caller 402 may hear, "Please enjoy the first three minutes of your phone call compliments of Ruby Tuesday's® restaurant," while physically being in a position to see the Ruby Tuesday's® restaurant. Such an offer may motivate callers to move from their present location in shopping mall 300 to be within a femtocell base station 208 wireless communication coverage area where they may obtain a discount on their phone call. By bringing potential customers closer to a set of retail stores 302 serviced by a given femtocell base station 208, method 500 may make it more likely that such customers may enter those retail stores, which is a desirable outcome for the set of retail stores 302. Under this example, as the number of femtocell base stations 208 within shopping mall 300 increase, the coverage area for a given femtocell base station 208 may be decreased such as to a point where a consumer needs to be standing directly in front or within a particular store to take advantage of offers included in a targeted content message. Here, each retail store 302 may desire their own, relatively inexpensive femtocell base station 208 as part of their advertising budget.

A ring cadence may be two seconds of ringing followed by four seconds of silence. In one example, the time over which coupons may be conveyed to caller 402 may not be less than eight seconds and not greater than twenty seconds. However, the time over which coupons are conveyed to caller 402 should be long enough to convey the message but not longer than that which would tax the patience of caller 402. In another example, the time over which coupons may be conveyed to caller 402 may not be less than five seconds and not greater than seven seconds. Since the ringback tone heard by caller 402 may be out of sync with the ringing signal heard by the called person, the coupon packet may include coding to force a tine delay between caller 402 hearing the ringback tone and the person receiving the call hearing the ringing signal. This may allow method 500 to implement a predetermined time over which coupons may be conveyed to caller 402. From step 522, method 500 may return to step 506.

Figure 6:
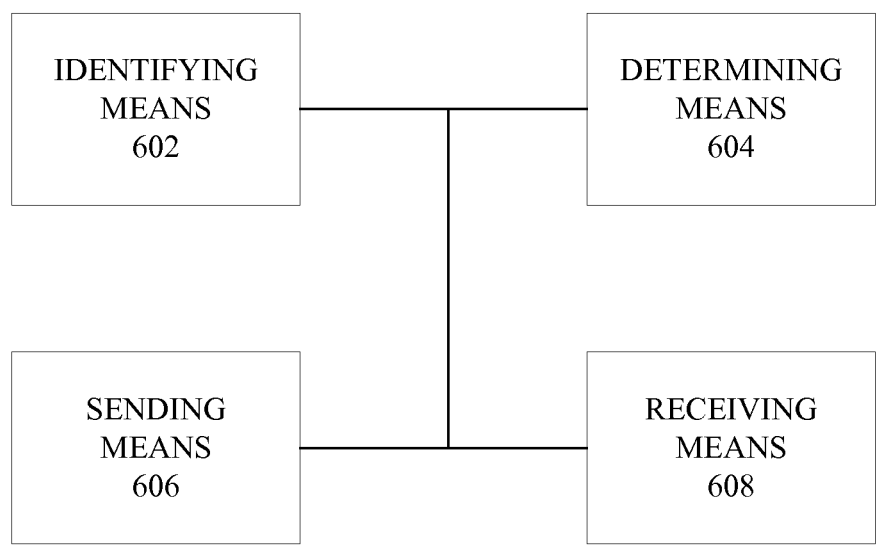
FIG. 6 is a simplified block diagrams of several sample aspects of apparatuses configured to facilitate communication handoff as taught herein.

FIG. 6 is a simplified block diagrams of several sample aspects of apparatuses configured to facilitate communication handoff as taught herein. The components described herein may be implemented in a variety of ways. Referring to FIG. 6, apparatus 600 is represented as a series of interrelated functional blocks. The function block diagram may describe a function between input variables and output variables utilizing a set of elementary blocks where input and output variables may be connected to blocks by connection lines and an output of a block also may be connected to an input of another block. In some aspects, the functionality of these blocks may be implemented as a processing system including one or more processor components. In some aspects, the functionality of these blocks may be implemented using, for example, at least a portion of one or more integrated circuits (e.g., an ASIC). As discussed herein, an integrated circuit may include a processor, software, other related components, or some combination thereof. The functionality of these blocks also may be implemented in some other manner as taught herein. The apparatus 600 may include one or more modules that may perform one or more of the functions described above with regard to various figures. Apparatus 600 may include an identifying means 602, a determining means 604, a sending means 606, and a receiving means 608, each configured to be in communication with other elements of apparatus 600. Outputs of identifying means 602 and determining means 604 may be transmitted between sending means 606 and receiving means 608.

Identifying means 602 may correspond to, for example, a mobile device set identifier such as for mobile devices presently in communication with the femtocell base station and whose unique identifiers are preregistered with the femtocell base station and such as discussed herein. Identifying means 602 may correspond to a processor such as discussed herein. The processor may instruct a receiver to monitor for signals on an uplink and instruct a processor to process any signals received by the receiver. The processor may attempt to demodulate and decode received signals. The processor may generate information relating to acquired signals. The processor may be a central processing unit and may be a machine that can execute computer programs.

A determining means 604 may correspond to, for example, a processor as discussed herein. Determining means 604 may correspond to, for example, a signal processor as discussed herein. The processor may determine whether a received call includes one of a unique identifier of a target mobile device and a unique identifier of the femtocell base station. The processor may determine whether a second mobile device answered a paging message if the call is for the second mobile device. The processor may determine whether a first mobile device answered a paging message if the second mobile device did not answered the call, determine whether to disconnect the first mobile device from a traffic channel with the femtocell base station if the second mobile device answered the paging message and the first mobile device answered the paging message, and determine whether a conference call feature has been enabled in the femtocell base station. In addition, the processor may determine whether to block the second mobile device from answering the paging message if the first mobile device answered the paging message.

A sending means 606 may correspond to, for example, a device such as a transceiver to send a paging message from the femtocell base station as discussed herein. Sending means 606 may correspond to, for example, a controller as discussed herein. A receiving means 608 may correspond to, for example, a transceiver to receive a call in the femtocell base station as discussed herein. Receiving means 608 may correspond to, for example, a communication controller as discussed herein. One transceiver may communicate with other transceivers and with other nodes. Each transceiver may include a respective transmitter to send signals and a respective receiver to receive signal. Each transceiver may receive and process a respective information stream to provide one or more analog signals, and further conditions (e.g., amplifies, filters, and upconverts) the analog signals to provide a modulated signal suitable for transmission. A transceiver may include at least one of a transmitter and a receiver, where a transmitter and receiver may be combined and share common circuitry or a single housing.

While the specification describes particular examples of the present invention, those of ordinary skill can devise variations of the present invention without departing from the inventive concept. For example, the teachings herein refer to circuit-switched network elements but are equally applicable to packet-switched domain network elements.

Those skilled in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those skilled in the art will further appreciate that the various illustrative logical blocks, modules, circuits, methods and algorithms described in connection with the examples disclosed herein may be implemented as electronic hardware, computer software, or combinations of both. To clearly illustrate this interchangeability of hardware and software, various illustrative components, blocks, modules, circuits, methods and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

The methods or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. Additionally, in some aspects, the steps and/or actions of a method or algorithm may reside as one or any combination or set of codes and/or instructions on a machine readable medium and/or computer readable medium, which may be incorporated into a computer program product.

Part or all of the systems mentioned herein may be implemented as a computer program product on a storage medium having instructions stored thereon/in. These instructions may be used to control, or cause, a computer to perform any of the processes. For example, a computer may execute a computer readable medium having a set of instructions which, when executed by a computer, cause the computer to deliver a coupon to a mobile device using method 300. The storage medium may include without limitation any type of disk including floppy disks, mini disks (MD's), optical disks, DVDs, CD-ROMs, micro-drives, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed examples is provided to enable any person skilled in the art to make or use the present invention. Various modifications to these examples will be readily apparent to those skilled in the art, and the generic principles defined herein may be applied to other examples without departing from the spirit or scope of the invention. Thus, the present invention is not intended to be limited to the examples shown herein but is to be accorded the widest scope consistent with the principles and novel features disclosed herein.

What is claimed is:

1. A method to deliver a targeted content message to a mobile device, the method comprising:
    identifying a set of businesses within a coverage area of a femtocell base station to produce gathered information;
    receiving a request for a dial tone from the mobile device through the femtocell base station;
    identifying a set of targeted content messages as a function of the gathered information;
    determining a delivery priority for targeted content messages among the set of targeted content messages, based at least in part on different given values of display revenue for different targeted content messages among said set, wherein the delivery priority gives first delivery to a targeted content message among the set having a higher given value of display revenue; and
    sending, according to the determined delivery priority, targeted content messages from the set of targeted content messages to the mobile device in place of at least part of the requested dial tone,
    wherein sending the targeted content messages according to the determined delivery priority includes:
        sending to the mobile device, during a given tone period, a first targeted content message from said set having a determined delivery priority higher than a second targeted content message from said set, and
        determining, after sending of the first targeted content message, whether a sufficient amount of time is remaining in the given tone period to send the second targeted content message and, if the time is determined sufficient, sending the second targeted content message to the mobile device, else not sending the second targeted content message.

2. The method of claim 1, further comprising: identifying a profile of a caller utilizing the mobile device as part of the gathered information.

3. The method of claim 1, further comprising: sending at least one of the targeted content messages to the mobile device as part of a text message.

4. The method of claim 1, further comprising: sending at least one of the targeted content messages to the mobile device as part of a Multimedia Messaging Service message having an image of a targeted content message.

5. The method of claim 1, wherein the targeted content message comprises an audio message informing of a coupon sent to the mobile device, and wherein sending the targeted content message to the mobile device comprises sending the audio message to the mobile device in place of at least part of the requested dial tone.

6. An apparatus to deliver a targeted content message to a mobile device, the apparatus comprising:
    means for identifying a set of businesses within a coverage area of a femtocell base station to produce gathered information;
    means for receiving a request for a dial tone from the mobile device through the femtocell base station; and
    means for identifying a set of targeted content messages as a function of the gathered information;
    means for determining a delivery priority for targeted content messages among the set of targeted content messages, based at least in part on different given values of display revenue for different targeted content messages among said set, and wherein the delivery priority gives first delivery to the targeted content message among the set having a higher given value of display revenue; and
    means for sending the targeted content messages from the set of targeted content messages, according to the determined deliver priority, to the mobile device as part of the requested dial tone,
    wherein the means for sending the targeted content messages according to the determined delivery priority includes:
        means for sending to the mobile device, during a given tone period, a first targeted content message from said set having a determined delivery priority higher than a second targeted content message from said set, and
        means for determining, after sending of the first targeted content message, whether a sufficient amount of time is remaining in the given tone period to send the second targeted content message and, if the time is determined sufficient, sending the second targeted content message to the mobile device, else not sending the second targeted content message.

7. The apparatus of claim 6, further comprising: means for identifying a profile of a caller utilizing the mobile device as part of the gathered information.

8. The apparatus of claim 6, wherein a first business owns the femtocell base station, the apparatus further comprising:
    means for sending additional targeted content messages to the mobile device, wherein the additional targeted content messages include additional targeted content messages for businesses other than the first business that owns the femtocell base station.

9. The apparatus of claim 8, wherein at least one of the additional targeted content messages is sent to the mobile device as part of a text message.

10. The apparatus of claim 8, wherein at least one of the additional targeted content messages is sent to the mobile device as part of a Multimedia Messaging Service message having an image of a targeted content message.

11. The apparatus of claim 6, wherein the targeted content message comprises an audio message informing of a coupon sent to the mobile device, and wherein the means for sending the targeted content message to the mobile device as at least part of the requested dial tone is further configured to send the audio message to the mobile device in place of at least part of the requested dial tone.

12. An apparatus to deliver a targeted content message to a mobile device, the apparatus comprising:
an identifier configured to identify a set of businesses within a coverage area of a femtocell base station, to produce gathered information, and to identify a set of targeted content messages as a function of the gathered information, and to determine a delivery priority for targeted content messages among the set of targeted content messages, based at least in part on different given values of display revenue for different targeted content messages among said set, wherein the delivery priority gives first delivery to the targeted content message among the set having a higher given value of display revenue; and; and
a transceiver configured to receive a request for a dial tone from the mobile device through the femtocell base station and configured to send the targeted content messages from the set of targeted content messages, according to the determined delivery priority, to the mobile device in place of at least part of the requested dial tone,
wherein the transceiver is further configured
to send to the mobile device, during a given tone period, a first targeted content message from said set having a determined delivery priority higher than a second targeted content message from said set; and
to determine, after sending of the first targeted content message, whether sufficient amount of time is remaining in the given tone period to send the second targeted content message and, if the time is determined sufficient, to send the second targeted content message to the mobile device, else to not send the second targeted content message.

13. The apparatus of claim 12, wherein the identifier further is configured to identify a profile of a caller utilizing the mobile device as part of the gathered information.

14. The apparatus of claim 12, wherein a first business owns the femtocell base station, and wherein the transceiver is further configured to send additional targeted content messages to the mobile device, wherein the additional targeted content messages are for businesses other than the first business that owns the femtocell base station.

15. The apparatus of claim 14, wherein at least one of the additional targeted content messages is sent to the mobile device as part of a text message.

16. The apparatus of claim 14, wherein at least one of the additional targeted content messages is sent to the mobile device as part of a Multimedia Messaging Service message having an image of a targeted content message.

17. The apparatus of claim 12, wherein the targeted content message comprises an audio message informing of a coupon sent to the mobile device, and wherein the transceiver is further configured to send the audio message to the mobile device in place of at least part of the requested dial tone.

18. A computer program product comprising:
a non-transitory computer readable medium comprising:
code for causing at least one computer to identify a set of businesses within a coverage area of a femtocell base station to produce gathered information;
code for causing at least one computer to receive a request for a dial tone from a mobile device through the femtocell base station;
code for causing at least one computer to identify a set of targeted content messages as a function of the gathered information;
code for causing at least one computer to determine a delivery priority for targeted content messages among the set of targeted content messages, wherein the delivery priority is based at least in part on different given values of display revenue for different targeted content messages among said set, wherein the delivery priority gives first delivery to a targeted content message among the set having a higher given value of display revenue
code for causing at least one computer to send the targeted content messages from the set of targeted content messages, according to the determined delivery priority, to the mobile device as at least part of the requested dial tone,
wherein the code for causing at least one computer to send the targeted content messages includes:
code for causing at least one computer to send to the mobile device, during a given tone period, a first targeted content message from said set having a determined delivery priority higher than a second targeted content message from said set; and
code for causing at least one computer to determine, after sending of the first targeted content message, whether sufficient amount of time is remaining in the given tone period to send the second targeted content message and, if the time is determined sufficient, to send the second targeted content message to the mobile device, else to not send the second targeted content message.

19. The computer program product of claim 18, further comprising:
code for causing at least one computer to identify a profile of a caller utilizing the mobile device as part of the gathered information.

20. The computer program product of claim 18, wherein a first business owns the femtocell base station, further comprising:
code for causing at least one computer to send additional targeted content messages to the mobile device, wherein the additional targeted content messages include additional targeted content messages for businesses other than the first business that owns the femtocell base station.

21. The computer program product of claim 20, wherein at least one of the additional targeted content messages is sent to the mobile device as part of a text message.

22. The computer program product of claim 20, where at least one of the additional targeted content messages is sent to the mobile device as part of a Multimedia Messaging Service message having an image of a targeted content message.

23. The computer program product of claim 18, wherein the targeted content message comprises an audio message informing of a coupon sent to the mobile device, and wherein the code for causing at least one computer to send the targeted content messages to the mobile device as at least part of the requested dial tone comprises code for causing at least one computer to send the audio message to the mobile device in place of at least part of the requested dial tone.

\* \* \* \* \*